D. MOULD.
MILK STRAINER.
APPLICATION FILED JUNE 4, 1918.

1,291,599.

Patented Jan. 14, 1919.

Witnesses
Philip Serrell
Francis L. Barrell

Inventor
D. Mould
By D. Swift & Co.
Attorneys

UNITED STATES PATENT OFFICE.

DANIEL MOULD, OF ULSTERVILLE, NEW YORK.

MILK-STRAINER.

1,291,599. Specification of Letters Patent. Patented Jan. 14, 1919.

Application filed June 4, 1918. Serial No. 238,131.

*To all whom it may concern:*

Be it known that I, DANIEL MOULD, a citizen of the United States, residing at Ulsterville, in the county of Ulster, State of New York, have invented a new and useful Milk-Strainer; and I do hereby declare the following to be a full, clear, and exact description of the invention, such as will enable others skilled in the art to which it appertains to make and use the same.

This invention relates to an improved strainer for straining milk when pouring the milk from the milk pail into another receptacle. For instance the strainer is placed over a receptacle, then the milk is emptied from the milk pail into the reservoir of the strainer, which as the milk passes therethrough, strains it, so that the sediment will settle in the bottom of the pit of the strainer.

One of the objects of the invention is to provide a device of this kind having means for drawing off the sediment which collects into the bottom of the pit.

A further object of the invention is to provide an overflow chamber or pit, through which the milk passes, there being straining means for straining the milk as it passes through the chamber.

A further object of the invention is the provision of means whereby the overflow chamber may be adjusted, in fact made larger or smaller.

In practical fields the details of construction may necessitate alterations falling within the scope of what is claimed.

The invention comprises further features and combination of parts as hereinafter set forth shown in the drawings and claimed.

In the drawings:—

Figure 2:
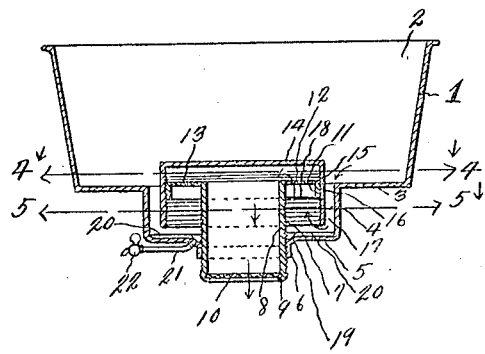
Fig. 2 is a vertical sectional view through the same.
Figure 1:
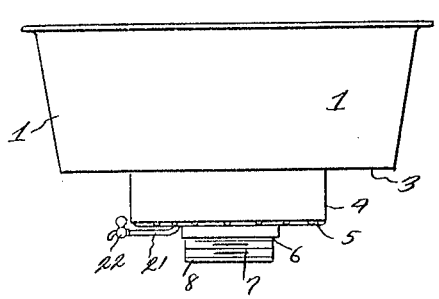
Figure 1 is a view in side elevation of the improved strainer constructed in accordance with the invention.
Figure 3:
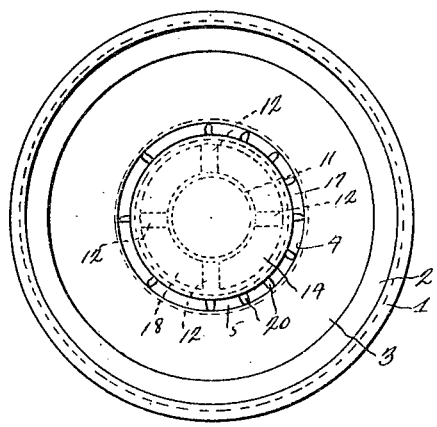
Fig. 3 is a top plan view.
Figure 4:
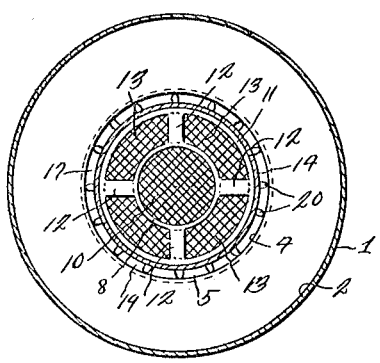
Fig. 4 is a sectional view on line 4—4 of Fig. 2.
Figure 5:
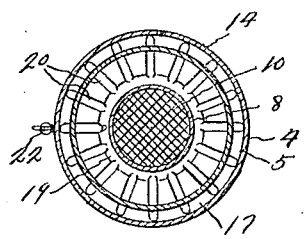
Fig. 5 is a cross sectional view on line 5—5 of Fig. 2.

Referring more especially to the drawings, 1 designates a receptacle or casing having a reservoir 2, into which the milk to be strained may be emptied from a milk pail or the like (not shown). The bottom 3 of the receptacle or casing is provided with a countersunk portion 4, the wall of which may extend into a receptacle (not shown), to receive the milk as it is strained. The bottom 5 of the countersunk portion has a flanged threaded opening 6, the threads of which are engaged by the threads 7 of the tubular member 8. The lower end of the tubular member is provided with an inturned crimped flange 9 to support and hold a wire fabric straining bottom 10. A cylindrical band 11 is in surrounding and spaced relation with the upper end of the tubular member, there being bars or arms 12 integrally connecting the band and the tubular member, to hold the band spaced from the tubular member as shown. Suitable straining means such as wire fabric or the like 13 also integrally connects the upper ends of the tubular member and the band, between the arms or bars 12. An inverted cylindrical casing 14 has its interior cylindrical wall provided with threads 15 to engage the exterior threads 16 of the band 11. This inverted casing has its lower end opened and its upper end closed, and is spaced from the interior cylindrical surface of the wall of the countersunk portion 4, thereby providing the passages 17 and 18 for the milk. The bottom 5 of the countersunk portion adjacent the flanged threaded opening 6 is provided with an annular gulley or channel 19. The bottom 5 is also provided with radial depressions or grooves or gulleys 20 leading into the annular channel 19, so as to carry the sediment toward the central opening of the bottom 5. A drain tube 21 is threaded into the bottom 5 adjacent the channel 19, and is provided with a drain cock 22, for removing the sediment. It is to be noted that by the provision of the threaded connections between the tubular member and the threaded flanged opening 6, said tubular member may be adjusted vertically, so as to raise and lower the screening means 13 toward and from the bottom 5 so as to accommodate the different levels of milk in the countersunk portion 4. It is to be further noted that by the provision of the threaded connection between the casing 14 and the band 18, the distance between the lower edge of the side wall of the casing 14 and the bottom 5 may be varied, so as to restrict the passage of milk therethrough. The milk from a pail (not shown) is emptied into the reservoir 2, after which it enters the passages 17 and 18, the sediment settling upon the bottom 5 and being conveyed to the channel 19, while the milk is strained through the straining means 13 and 10, the milk subsequently passing through the strainer 10 may enter another receptacle (not shown), after which it is ready for use.

The invention having been set forth what is claimed as new and useful is:—

1. The combination with a casing having its bottom provided with a countersunk portion, the bottom of which is provided with a threaded flanged opening, of a tubular member, adjustably threaded in said opening and having straining means extending radially from its upper end, the outer edge of said straining means having a band, and an inverted cup-shaped casing threaded to said band and extending into said countersunk portion and being spaced from the wall of the countersunk portion, thereby providing a down and up passage.

2. The combination with a casing provided with a countersunk portion in its bottom, of a tubular member adjustably mounted in the bottom of the countersunk portion, the upper end of the tubular member having radial arms, a band connected to the outer ends of said arms, straining means connecting between the band and the upper end of the tubular member in between said arms, a casing threaded to the band having its upper end closed and its lower end open and being in spaced relation to the inner cylindrical surface of the wall of the countersunk portion, whereby a down and up passage is provided between the wall of the countersunk portion, the second casing and the tubular member.

3. The combination with a casing provided with a countersunk portion in its bottom, of a tubular member adjustably mounted in the bottom of the countersunk portion, the upper end of the tubular member having radial arms, a band connected to the outer ends of said arms, strainer means connecting between the band and the upper end of the tubular member in between said arms, a casing threaded to the band having its upper end closed and its lower end open and being in spaced relation to the inner cylindrical surface of the wall of the countersunk portion, whereby a down and up passage is provided between the wall of the countersunk portion, the second casing and the tubular member, the lower end of the tubular member having straining means, and means for drawing off the sediment of the bottom of the countersunk portion.

4. The combination with a casing provided with a countersunk portion in its bottom, of a tubular member adjustably mounted in the bottom of the countersunk portion, the upper end of the tubular member having radial arms, a band connected to the outer ends of said arms, strainer means connecting between the band and the upper end of the tubular member in between said arms, a casing threaded to the band having its upper end closed and its lower end open and being in spaced relation to the inner cylindrical surface of the wall of the countersunk portion, whereby a down and up passage is provided between the wall of the countersunk portion, the second casing and the tubular member, the lower end of the tubular member having straining means, the bottom of the countersunk portion having an annular channel adjacent the tubular member and provided with radial depressions leading toward and into the channel, and means for draining the sediment from the channel.

In testimony whereof I have signed my name to this specification in the presence of two subscribing witnesses.

DANIEL MOULD.

Witnesses:
JOHN E. DURYEA,
A. WINFRED DECKER.

Copies of this patent may be obtained for five cents each, by addressing the "Commissioner of Patents, Washington, D. C."